F. CONRAD.
ELECTRICAL MEASURING INSTRUMENT.
APPLICATION FILED JUNE 4, 1906.

1,141,380.

Patented June 1, 1915.
3 SHEETS—SHEET 1.

WITNESSES:
C. L. Belcher
Otto S. Schairer

INVENTOR
Frank Conrad
BY
Wesley G. Carr
ATTORNEY

F. CONRAD.
ELECTRICAL MEASURING INSTRUMENT.
APPLICATION FILED JUNE 4, 1906.

1,141,380.

Patented June 1, 1915.
3 SHEETS—SHEET 2.

WITNESSES:
C. L. Belcher
Otto S. Schairer

INVENTOR
Frank Conrad
BY Wesley G. Carr
ATTORNEY

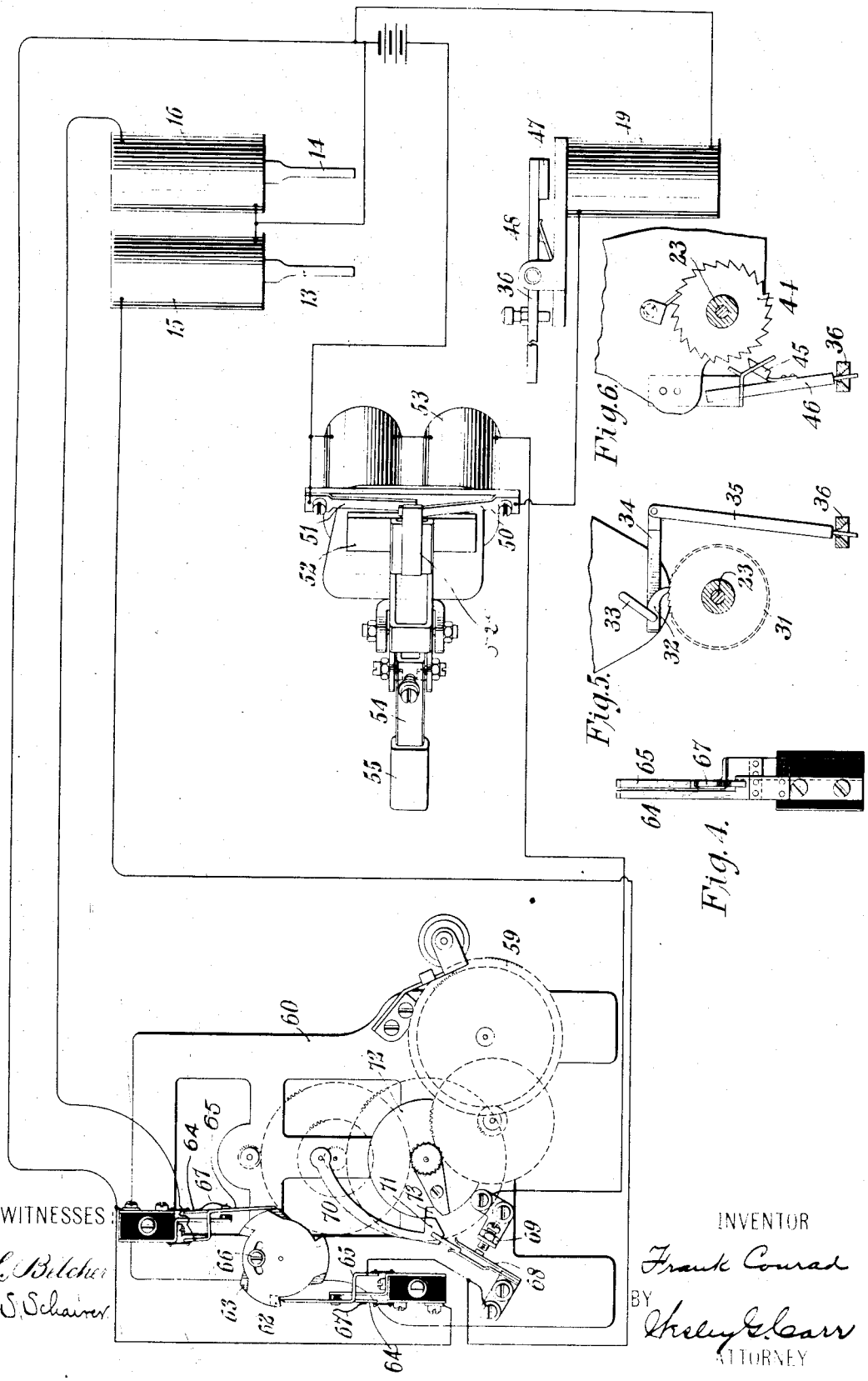

UNITED STATES PATENT OFFICE.

FRANK CONRAD, OF SWISSVALE, PENNSYLVANIA, ASSIGNOR, BY MESNE ASSIGNMENTS, TO CHICAGO ELECTRIC METER COMPANY, OF CHICAGO, ILLINOIS, A CORPORATION OF ILLINOIS.

ELECTRICAL MEASURING INSTRUMENT.

1,141,380.  Specification of Letters Patent.  Patented June 1, 1915.

Application filed June 4, 1906. Serial No. 320,123.

*To all whom it may concern:*

Be it known that I, FRANK CONRAD, a citizen of the United States, and a resident of Swissvale, in the county of Allegheny and State of Pennsylvania, have invented a new and useful Improvement in Electrical Measuring Instruments, of which the following is a specification.

My invention relates to electrical measuring instruments and particularly to such instruments as are adapted to indicate, in one manner or another, the maximum amount of power measured thereby during a given period of time.

The object of my invention is to provide practical and efficient means for rendering ascertainable the maximum amount of power measured by an instrument during any convenient fraction of a given period of time.

In the installation and equipment of electrical power houses, from 60 to 80 per cent. of the first cost is usually represented by the apparatus that is necessary to supply power in excess of the normal or average amount, and for that reason, station managers generally prefer to base their charges upon the unusual demand of a customer for power as well as upon the total amount used by him. In this manner, the expense of providing and maintaining the extra apparatus may be charged to those for whose benefit it is provided and not to those whose demand for power is uniform.

The purpose of the present invention is to provide means for rendering ascertainable the maximum amount of power that traverses a circuit during any minute in each hour in order that the average and the maximum amount of power used by a customer may be readily determined and be charged for according to its cost.

Figure 1:
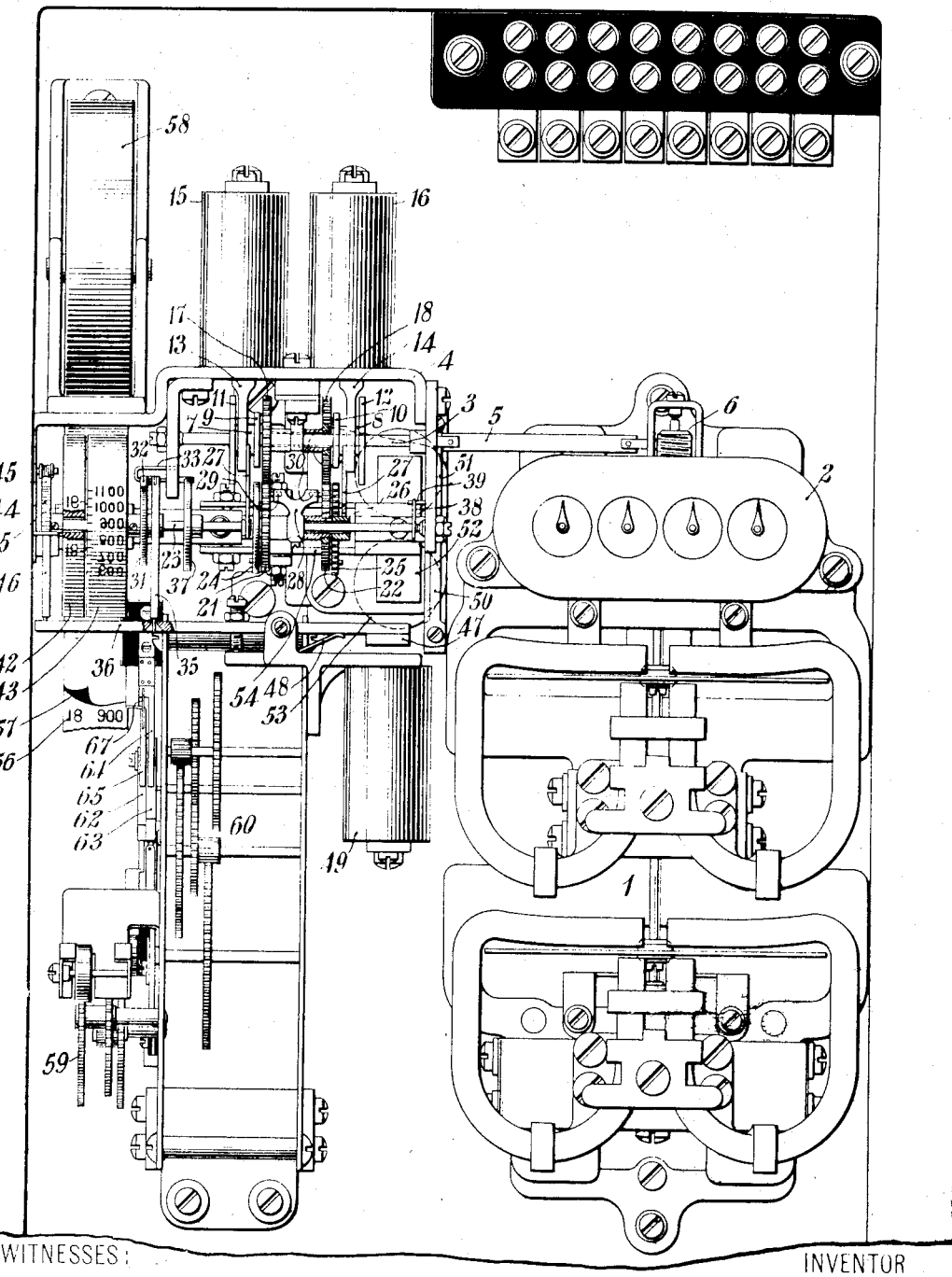
Figure 2:
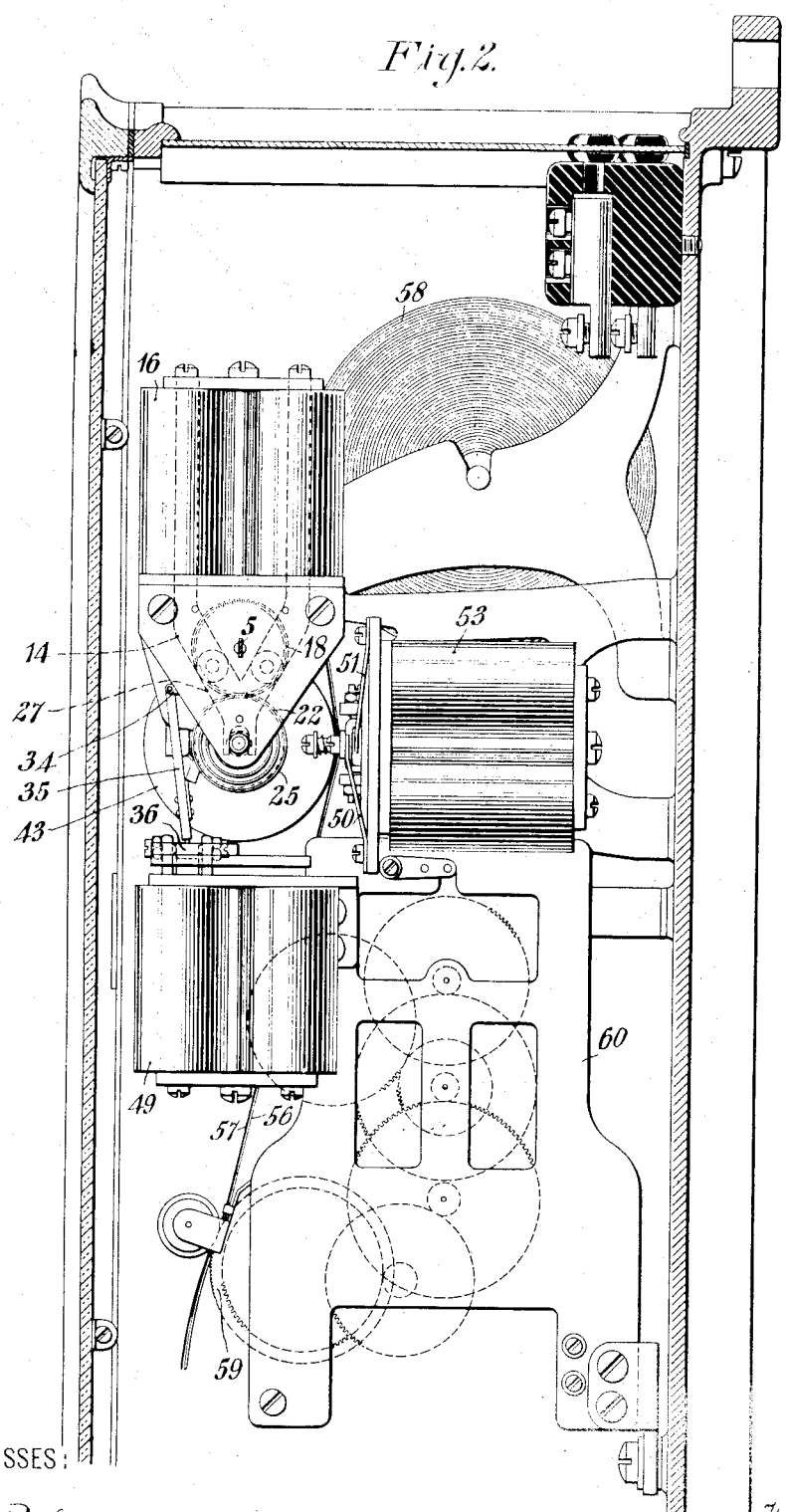

My invention is illustrated in the accompanying drawings, Figure 1 of which is a view, in front elevation, of an instrument that is constructed in accordance therewith. Fig. 2 is a view, in side elevation, of the instrument shown in Fig. 1, the casing being shown in section. Fig. 3 is a composite view, illustrating the arrangement of the circuits of the instrument and comprising a view, in side elevation, of the clock mechanism of the instrument and an additional view of the printing magnets and mechanism of the instrument. Fig. 4 is a view, in side elevation, of a portion of the clock mechanism shown in Fig. 3, and Figs. 5 and 6 are views in side elevation of certain pawls and ratchets that are employed in the instrument.

As here shown, an instrument 1, substantially like that which constitutes the subject-matter of an application, Serial No. 243,739, filed Feb. 1, 1905, by William M. Bradshaw, is provided for the purpose of registering upon a dial plate 2 the total amount of power that traverses a polyphase circuit (not shown), although the invention may be employed in connection with other instruments and devices, if desired. A shaft 3, that is mounted on a frame 4, is adapted to be rotated at speeds proportional to the amounts of power traversing the circuits of the instrument 1, by means of a flexible bar or strip 5, that is connected by worm gearing 6 to a movable part of the instrument 1.

Secured to the shaft 3 so as to be capable of limited movements longitudinally thereof, are two brass or other non-magnetizable sleeves 7 and 8 having flanges 9 and 10 formed integral with the inner ends thereof and iron or other magnetizable washers 11 and 12 mounted upon the outer ends thereof. The washers 11 and 12 serve as armatures for substantially U-shaped magnetizable cores 13 and 14, respectively, the ends of which are somewhat flattened and bent toward each other, windings 15 and 16 being provided for the magnetizable cores and mounted upon the upper side of the frame 4. When the windings 15 and 16 are energized, the armatures 11 and 12 are drawn toward the magnetizable cores 13 and 14 and the flanges 9 and 10 upon the sleeves 7 and 8 are thus brought, respectively, into engagement with the faces of gear wheels 17 and 18 that are loosely mounted upon the shaft 3, the armatures 11 and 12 being prevented, when the flanges are in engagement with the faces of the gears, from engaging the cores 13 and 14 and from thus interfering with the free rotation of the shaft 3. The gear wheels 17 and 18 mesh, respectively, with the other gear wheels 21 and 22 that are loosely mounted upon a shaft 23 having bearings in the frame 4, the gear wheels being secured to the outer ends of spiral springs 24 and 25, the inner ends of which are secured to sleeves 26 that are loosely mounted upon the shaft 23. The sides of the sleeves are milled away or are somewhat flattened and are engaged by the lower forked ends of substantially Y-shaped non-magnetizable pieces 27 that are secured to the converging ends of the magnetizable cores 13 and 14, thus serving to prevent rotation of the sleeves 26. Rigidly secured to the shaft 23, between the gear wheels 21 and 22, is a substantially Y-shaped arm or bracket 28, the free ends of which are adapted to be engaged, respectively, by pins 29 and 30 that are secured to the inner faces of the gear wheels 21 and 22, rotation of the gear wheels, in this manner, effecting rotation of the shaft 23.

The shaft 23 is retained in any position to which it may be moved by the gears 21 and 22 by means of a ratchet wheel 31 rigidly secured to the shaft and a coöperating pawl 32, here shown as formed at the end of the shorter leg of a substantially J or hook-shaped piece that is pivotally mounted near its bent end upon one leg of a staple 33. Pendantly supported at the outer end of the longer leg 34 of the hook-shaped piece is a rod 35, that is adapted to be raised once an hour by means of a bar 36 to cause the pawl 32 to release the ratchet wheel 31. When the ratchet wheel 31 is released, the shaft 23 is rotated to its initial position or until the arm 28 engages the one or the other of pins 29 and 30 by means of a spiral spring 37, the inner end of which is rigidly secured to the shaft 23 and the outer end of which is secured to a pendant portion of the frame 4. The shaft 23 is limited to an arc of movement of something slightly less than 360° by means of an arm 38 that is rigidly secured thereto and is adapted to engage a stop 39.

Disposed in close proximity to each other upon one end of the shaft 23, are two drums 42 and 43 that are provided with raised type, the divisions and type upon the former indicating hours or other convenient periods of time and those upon the latter indicating power or other units of measurement. The drum 43 is rigidly secured to the shaft 23 so as to be operated thereby, but the drum 42 is loosely mounted thereon and is operated by means of a ratchet wheel 44 and a pawl 45 that is carried by a rod 46 and is actuated once an hour, in order to move the ratchet and the drum one division, by means of the bar 36.

The bar 36 is pivotally mounted and carries, at its inner end, an armature 47 that is normally raised and retained in the position shown by means of a spring 48, but is adapted to be moved downwardly by means of an electro-magnet having a winding 49. The circuit of the magnet winding 49 is governed by means of a switching device comprising flexible strips 50 and 51 that are brought into engagement when an armature 52 is attracted by another electro-magnet having a winding 53. The armature 52 and an extension 52$^a$ whereby the flexible strips 50 and 51 are pressed into engagement are carried at one end of a flexible and pivotally mounted arm 54, the outer end of which is located in close proximity to the drums 42 and 43 and is provided with a rubber or other resilient pad or cover 55. A record strip 56 and a strip of carbon paper 57 are adapted to be drawn from a supply roll 58 between the pad 55 and the drums 42 and 43 by means of a feed roll 59 that is operated by a suitable clock work 60. The record and carbon strips are pressed against the type by the pad 55 when the winding 53 is energized, and a record both of time and power is thus made upon the strip 56.

The circuits of the magnet windings 15, 16 and 53 are governed by means of devices that are operated by the clock mechanism 60, the controlling device for the windings 15 and 16 comprising two notched disks 62 and 63 and two pairs of flexible strips 64 and 65 that are adapted, respectively, to engage the peripheries thereof, upon opposite sides. The disks are clamped together so as to be capable of adjustment in position with reference to each other by means of a set screw 66 that is threaded in the disk 63 and projects through a slot in the disk 62. The flexible strips 64 and 65 form circuit terminals that are adapted to be connected by means of a spring 67 only when the strips engage simultaneously the portions of the greatest diameter of the corresponding disks. The disks 62 and 63 are so proportioned and disposed with reference to each other, and the strips 64 and 65 are so arranged, that the magnet windings 15 and 16 will be energized alternately for a minute each, and also so that the beginning and expiration of successive minute periods will not exactly coincide, in order that the one or the other or both of the magnet windings may always be energized.

The means for controlling the circuit of the magnet winding 53 comprises a flexible strip 68 that is adapted to be moved into engagement with a stationary contact terminal or stop 69 by means of a gravity-actuated arm 70 when a projection 71 at its lower end, that normally rides upon the periphery of a disk 72, drops into a notch 73 therein, the disk 72 making one revolution each hour or other convenient period. Since the disk 72 is rotated very slowly and disengagement of the strip 68 from the contact terminal 69 may not be effected thereby as readily as may be desired, the circuit thereof is here shown as further controlled by one of the pairs of strips which controls the circuit of one of the magnet windings 15 and 16, the circuit of the magnet winding 53 therefore remaining established not longer than a minute. The circuit of the magnet winding 49 is controlled by the device comprising the strips 50 and 51 that are brought into engagement when the winding 53 is energized, as before explained, but not, however, until the arm 54 has pressed the record and carbon strips against the type drums, such operation being permitted on account of the flexibility of the arm 54. Thus a record is made upon the record strip before the pawl 32 is raised to release the shaft 23 and before the drum 42 is moved forward another division, which will of course occur immediately after the winding 49 becomes energized.

In the operation of the instrument, the shaft 3 is rotated at variable speeds in accordance with the amount of power traversing the circuits of the instrument 1, and since the magnet windings 15 and 16 cause magnetization of the cores 13 and 14 alternately for periods of a minute each, the armatures 11 and 12 will be attracted thereby alternately and cause the gear wheels 17 and 18 to be operatively connected to the shaft 3 alternately for corresponding periods. The angles of movement of the gear wheels 17 and 18 will be proportional to the total number of revolutions made by the movable member of the instrument 1 during alternate minutes; that is, to the amounts of power that traverse the circuits of the instrument during alternate minutes. The gear wheels 17 and 18 cause the gear wheels 21 and 22, respectively, to be moved corresponding amounts which, in turn, may effect movement of the shaft 23 by means of the arm 28 and the pins 29 and 30, the shaft being retained in any position to which it may be moved by means of the ratchet wheel 31 and the pawl 32. To be more definite, let it be understood, for example, that during the first minute of operation of the instrument the magnet winding 16 is energized. The armature 12 will then be attracted by the core 14 and the flange 10 will make frictional engagement with the face of the gear wheel 18. The gear wheels 18 and 22 will then be rotated through angles proportional to the total amount of power that traverses the instrument during the first minute, and the gear wheel 22 will effect rotation of the shaft 23 a corresponding amount. At the expiration of the minute the magnet 16 becomes deënergized, and the flange 10 no longer exerts pressure upon the face of the gear wheel 18, the gear wheels 18 and 22 being then returned to their initial positions by means of the spring 25. During the next minute the gear wheels 17 and 21 are similarly operated and, if the total amount of power that traverses the instrument exceeds that which traverses it during the first minute, the shaft 23 will be moved an additional amount that is proportional to the amount by which the power during the second minute exceeds that during the first. At the expiration of an hour, the circuit of the magnet winding 53 will be established, as before described, and the strips of paper 56 and 57 will be pressed against the type drums 42 and 43 by the rubber pad 55 which thereby causes a record to be printed upon the record strip of the hour and the greatest amount of power supplied to the circuit through the instrument during any minute of that hour. Immediately thereafter the circuit of the magnet winding 49 is established and the bar 36 is raised to cause the pawl 32 to release the ratchet wheel 31 which thereby permits the spring 37 to return the shaft 23 to its initial position, or until the arm 28 engages the one or the other of the pins 29 and 30. The raising of the bar 36 also causes the pawl 45 to engage the ratchet wheel 44 and rotate it and the drum 42 through an angle proportional to the pitch of the teeth of the ratchet wheel.

It will be readily understood that the position of the drum 43 is always indicative of the greatest amount of power that has traversed the circuits of the instrument during any minute of the hour during which the instrument may be inspected, and, if desired, other more convenient means for effecting such indications may be employed. The mechanism here applied to an integrating instrument may obviously be employed in connection with other forms of instruments and with other devices for the purpose of indicating or recording the maximum number of revolutions made by a part during a suitable fraction of any desired interval of time. The structural details and arrangements of the parts may also be varied, within wide limits, from what has been shown and described without altering the mode of operation of the invention or departing materially from its spirit and I desire that all such modifications shall be included within its scope.

As here shown, two pairs of gear wheels are employed for connecting the driving and driven shafts and the periods of operation of the respective pairs are caused to overlap in order that the operation of the maximum demand mechanism may be continuous, and to thereby insure that there may be no intervals during which the instrument does not take cognizance, though, if desired, only a single pair may be employed which may be released at the end of each minute or other period, only for a sufficient interval to permit restoration thereof to their initial positions.

I claim as my invention:

1. In an electrical measuring instrument, the combination with means for registering and indicating directly the total of the forces exerted through a given circuit, of means for printing a record of the maximum force so exerted during a given interval of time.

2. The combination with a shaft that rotates at variable speeds, of a member that is deflected an amount proportional to the total number of rotations of said shaft during a given period of time, means for retaining the said member in the extreme position to which it has been moved during and until the expiration of a longer interval of time, and means for simultaneously effecting records denoting the positions of the member at the expirations of said longer periods and the period during which the position is assumed.

3. In an electrical measuring instrument, the combination with parts that are moved alternately during given periods of time in accordance with the total amounts of power that transverse the circuits during said periods, and a part that is moved thereby an amount proportional to the greatest movements thereof.

4. The combination with a movable member, of parts that are moved thereby independently and alternately in accordance with the total amounts of movement of said member during given periods of time.

5. The combination with a movable member, of parts that are moved thereby independently and alternately in accordance with the total amounts of movement of said member during given periods of time, and a part that is moved by the aforesaid parts an amount proportional to the greatest movements thereof.

6. The combination with a movable member, of parts that are moved thereby independently and alternately in accordance with the total amounts of movement of said member during given periods of time, and means for rendering ascertainable the maximum amount of movement of one or both of said parts that has occurred within a longer period of time.

7. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the driven shaft in one direction, and means for retaining the driven shaft in the extreme angular position to which it has been moved during and until the expiration of a longer period of time than the aforesaid period.

8. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the driven shaft in one direction, means for retaining the driven shaft in the extreme angular position to which it has been moved during and until the expiration of a longer period of time than the aforesaid period, and means for recording the maximum degree of movement of the driven shaft during the said longer period.

9. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the driven shaft in one direction, and means for simultaneously recording the expirations of longer periods of time than the aforesaid period and the maximum degrees of movement of the driven shaft during such longer periods.

10. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the shaft in one direction, means for returning the gear wheels to their initial positions when neither is connected to the said shaft, means for retaining the driven shaft in the extreme angular position to which it has been moved during a longer period than the aforesaid period, and means for causing the driven shaft to be released from its extreme position at the expiration of such longer period.

11. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the driven shaft in one direction, a ratchet wheel upon the driven shaft, a pawl engaging therewith, whereby the shaft is retained in the extreme angular position to which it has been moved during a longer period of time than the aforesaid period, and means for releasing the pawl upon the expiration of said longer period.

12. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the driven shaft in one direction, a ratchet wheel upon the driven shaft, a pawl engaging therewith, whereby the shaft is retained in the extreme angular position to which it has been moved during a longer period of time than the aforesaid period, means for releasing the pawl upon the expiration of said longer period, and means for simultaneously recording the maximum degree of movement of the driven shaft during the said longer period of time.

13. The combination with a driving shaft, a pair of gear wheels loosely mounted thereon, and means for connecting the same alternately to the shaft, each for a given period of time, of a driven shaft, a pair of gear wheels loosely mounted thereon that mesh with the aforesaid gear wheels, means whereby the gear wheels may effect movement of the driven shaft in one direction, a drum carried by the driven shaft, another drum that is rotated a certain amount at the expirations of longer periods of time than the aforesaid periods, and means for pressing a record strip against the drums at the expirations of said longer periods.

14. The combination with a driving shaft, a gear wheel loosely mounted thereon, and means for periodically connecting said gear wheel to the shaft for given periods of time, of a driven shaft, a gear wheel loosely mounted thereon to mesh with the aforesaid gear wheel, means whereby the gear wheel on the driven shaft may effect movement of the said shaft, and means for retaining the driven shaft in the extreme angular position to which it has been moved during and until the expiration of a longer period of time than the aforesaid period.

15. The combination with a driving shaft, a gear wheel loosely mounted thereon, and means for periodically connecting said gear wheel to the shaft for given periods of time, of a driven shaft, a gear wheel loosely mounted thereon to mesh with the aforesaid gear wheel, means whereby the gear wheel on the driven shaft may effect movement of the said shaft, and means for simultaneously recording the expirations of longer periods of time than the aforesaid periods and the maximum degrees of movement of the driven shaft during such longer periods.

16. The combination with a movable member, of a part that is moved periodically thereby in amounts proportional to the total amounts of movement of said member during given periods of time, a part that is moved by the aforesaid part an amount proportional to the greatest periodic movement thereof during a longer period of time, and means for printing a record of the greatest movement of said part at the expiration of such longer period.

17. An electrical measuring instrument comprising means for automatically rendering ascertainable during, or at any time after the expiration of, each of a plurality of equal periods of time, the maximum amount of power that traverses the instrument during a given fraction of each of the said periods of time.

18. A measuring instrument comprising a movable member and means for automatically rendering ascertainable during, or at any time after the expiration of, each of a plurality of equal intervals of time, the greatest amount of movement of the movable member during a given fraction of each of the said periods of time.

19. A recording wattmeter, comprising watt measuring and integrating mechanism, means for printing the integrations of said mechanism, a time-keeping mechanism, and electrically operated means whereby said time-keeping mechanism causes the actuation of said printing mechanism at predetermined periods of time.

20. In combination with one of the moving elements of a wattmeter, a movable recording element, connections between said movable element and recording element for transmitting motion to the latter at a speed proportionate to that of the meter element, and chronometer controlled electrically operated means for breaking said connections at regular predetermined intervals of time.

21. In combination with one of the movable elements of a wattmeter, a movable recording element, separate actuating devices for moving the recording element in the same direction, a driving element for said actuating devices, means for transmitting motion from the meter element to said driving element, and chronometer controlled means for alternately making and breaking connection between the driving element and said actuating devices at regular predetermined intervals of time.

22. In combination with one of the movable elements of a wattmeter, a movable recording element, separate actuating devices for moving the recording element in the same direction, a driving element for said actuating devices, means for transmitting motion from the meter element to said driving element, chronometer controlled means for alternately making and breaking connection between the driving element and said actuating devices at regular predetermined intervals of time, and additional means for returning the recording device toward its starting position after each break in the connection between the driving element and one of the actuating devices.

23. In combination with a revolving driving element, a recording element, separate devices for moving the recording element in one direction, means for returning said recording element toward its starting position after being operated by either of said actuating devices, and chronometer controlled means for alternately connecting said actuating devices with the revolving element at regular predetermined intervals of time.

24. In combination with a revolving cylinder, a chronometer rotated cylinder, a recording device movable along said cylinder, separate actuating devices for moving the recording device in one direction, and chronometer controlled means for alternately throwing said actuating devices into connection with the revolving element at regular predetermined intervals of time, each of said actuating devices having means for returning it toward its starting positions at the end of such interval of time.

In testimony whereof, I have hereunto subscribed my name this 29th day of May, 1906.

FRANK CONRAD.

Witnesses:
F. W. ANDREW,
BIRNEY HINES.